R. H. WAPPLER.
MULTIPHASE SLOW SINE WAVE PRODUCER.
APPLICATION FILED FEB. 6, 1919.

1,338,269. Patented Apr. 27, 1920.

Inventor
Reinhold H. Wappler
By his Attorney
Walton Harrison

UNITED STATES PATENT OFFICE.

REINHOLD H. WAPPLER, OF YONKERS, NEW YORK, ASSIGNOR TO WAPPLER ELECTRIC COMPANY, INC., A CORPORATION OF NEW YORK.

MULTIPHASE-SLOW-SINE-WAVE PRODUCER.

1,338,269.     Specification of Letters Patent.     Patented Apr. 27, 1920.

Application filed February 6, 1919. Serial No. 275,410.

*To all whom it may concern:*

Be it known that I, REINHOLD H. WAPPLER, a citizen of the United States, residing at Yonkers, county of Westchester, and State of New York, have invented certain new and useful Improvements in Multiphase-Slow-Sine-Wave Producers, of which the following is a full, clear, and concise description.

My invention relates to the production of multiphase slow sine waves adapted for general use, but specially suitable for the distribution and control of faradic currents as employed in electro-therapeutics.

More particularly stated, by my invention I seek to accomplish a number of purposes, among which are the following:

I. To subject the human body or some portion thereof to the action of multiphase currents so distributed to different muscles that each of these muscles has a momentary period of rest after each period of excitation.

II. To subject each muscle to the action of successive faradic currents varying gradually in potential from zero to a predetermined maximum and back to zero, the variations in potential being slow as compared with the cycle frequency and having the form of sine waves.

III. To enable the operator to control and adjust, within reasonable limits, the frequency of the successive periods during which the faradic currents rise to maximum potential—in other words, to control the frequency of the slow sine waves just mentioned.

IV. To produce improved faradic currents by causing a sine-wave alternating current in a primary circuit to induce faradic currents in a secondary circuit and to use a synchronous interrupter for breaking the primary circuit at the moment when the potential of the primary circuit is at its maximum.

V. To produce cycles each consisting of a multitude of successive sine waves of faradic current, each wave being applicable to one particular muscle and thus producing the contraction of one muscle or motor point; the series of contractions, each produced by one phase, being so distributed and combined that the anatomical member to be treated performs any desired cycle of motion.

Reference is made to the accompanying drawing forming a part of this specification, and in which like letters indicate like parts in both of the figures.

Figure 1:
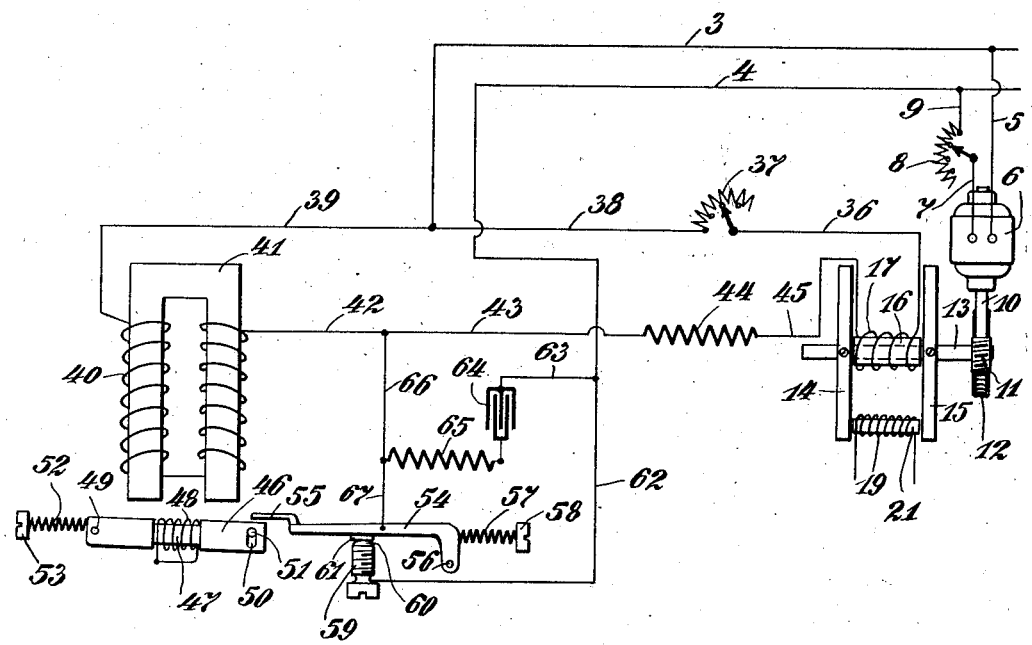
Figure 1 is a diagram of the wiring and shows the arrangement of the various mechanical parts.

Alternating current wires are shown at 3, 4. From the wire 3 a wire 5 leads to an induction motor 6. A wire 7 leads from this motor to a rheostat 8, and from the latter a wire 9 leads to the wire 4.

The motor 6 is provided with an armature shaft 10, carrying a worm 11, which engages a worm wheel 12. This worm wheel is mounted rigidly upon a revoluble shaft 13, and this shaft carries a pair of cores 14, 15 made of soft iron, each core having the form of a bar and revoluble end over end.

Between the bars 14, 15 is a stationary tube 16, made of non-magnetic material and preferably an insulator. It supports the primary winding 16, which is thus stationary.

There are three secondary windings, which are shown at 18, 19, 20, and supported upon stationary cores 21, 22, 23.

Wires 24, 25, 26 constitute connections between the secondary windings, and connected with these wires are flexible conductors 27, 28, 29, preferably cords. These carry faradic electrodes 30, 31, 32, here shown as applied to the arm 33 of a patient. Different groups of muscles are indicated by dotted lines 34, 35.

A wire 36 leads from the primary winding 17 to a rheostat 37, and a wire from this rheostat is connected with a wire 39 and with the wire 3.

The wire 39 leads to the winding 40 of a magnet 41. A wire 42 is connected with the winding 40 and with two wires 66 and 43, the wire 43 leading to a resistance 44, and from this resistance a wire 45 leads to the primary winding 17.

Disposed adjacent the magnet 41 is an armature 46, consisting of a flat bar of soft iron provided with a waist portion 47, and encircling this waist portion is a self-closed winding 48. I find that by the use of this self-closed winding the movements of the armature may be synchronized with alternating currents of commercial frequency used to energize the magnet 41.

The armature is carried by a pin 49, and is provided with a small slot 50 extending through it and located adjacent its free end, the length of the slot crossing the length of the armature. Extending through the slot 50 is a pin 51, made of non-magnetic metal such as brass and fixed in position so as to limit the play of the armature as it vibrates. A compression spring 52 abuts against the adjacent end portion of the armature, at a point a little off the center of the axis of the pin 49, and by its pressure tends to swing the armature in a clockwise direction according to Fig. 1 to an extent limited by the length of the slot 50, as shown. An adjusting screw 53 engages the adjacent end of the spring 52.

A contact arm 54, provided with a finger 55, is journaled upon a pin 56 and is engaged by a compression spring 57, the tension of this spring being controllable by an adjusting screw 58. The contact arm 54 carries a contact face 61, which is disposed adjacent to and adapted to strike against the end 60 of a contact screw 59.

The parts just described constitute an interrupting device which is driven synchronously from the source of alternating currents and is in series with the primary winding 16 with reference to the alternating current, which is supplied by the wires 3 and 4. Thus the interrupting device, under control of the magnet 41, prevents the primary winding 16 from being energized except when the magnet 41 is deënergized.

The purpose of the resistance 44 is auxiliary to that of the rheostat 37, and protects the primary winding 16 when the rheostat 44 is in such position as to offer but little resistance to the passage of the current.

The parts are so proportioned, arranged and adjusted as to occupy the positions indicated for them in Fig. 1, so long as the magnet remains deënergized. That is, the contact arm 54 is lodged against the screw 59 by the pressure of the spring 57, and the armature 46, under pressure of the spring 52, is out of engagement with the finger 55. As soon, however, as the magnet is energized and thus attracts the armature 46, the latter swings slightly upon the pin 49, engages the finger 55 and carries the contact arm out of engagement with the contact screw 59.

Each time the magnet is deënergized, the movable parts resume their respective normal positions of idleness, as indicated in Fig. 1.

A wire 62 leading from the contact screw 59 is connected to the wire 4 and also to a wire 63, the latter leading to a condenser 64. A resistance 65 is connected with this condenser, and with two wires 66, 67. The wire 66 is connected with the two wires 42 and 43, and the wire 67 leads to the contact arm 54.

The electrodes 30, 31, 32 are so positioned relatively to the arm 33 of the patient that several distinct muscles are energized one at a time, each by an individual phase of the current. For instance, there might first be a current flowing through the particular muscle 34, next one flowing through the muscle 35, then one flowing through a group consisting wholly or partially of the two muscles just mentioned. Again, after a current passes through any particular muscle, the next successive current through the same muscle, is reversed in direction. Thus for each revolution of the shaft 13, the patient's arm is subjected to six distinct electrical conditions, independently of the frequency and intensity of the currents. By varying the intensity and frequency of the faradic currents, as hereinafter described, the number and variety of the physiological effects is increased still further.

Figure 2:
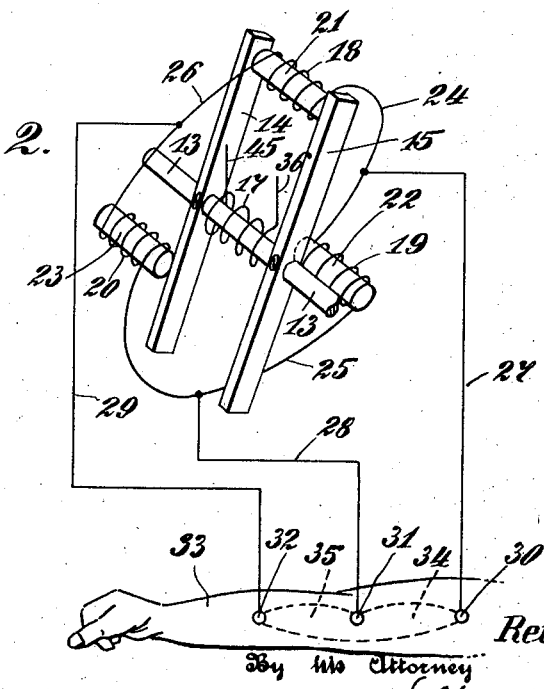
Fig. 2 is a fragmentary diagram of the multiphase rotary transformer and the faradic circuits.

The device shown in the upper portion of Fig. 2 is essentially a multiphase rotary transformer for producing faradic currents. The two bars 14, 15, together constitute a rotor, which is provided with poles arranged in pairs. As the rotor turns, say in a clockwise direction according to Fig. 2, the rotor first presents a pair of its poles to the core 21, then presents its other pair of poles to the core 23, next presents its first-mentioned pair of poles to the core 22, then its second-mentioned pair of poles to the core 21, then its first-mentioned pair of poles to the core 23, then its second-mentioned pair of poles to the core 22.

As each pair of poles of the rotor approach and recede from any given core, such core is energized inductively, with a frequency corresponding to the alternating current frequency of the mains. Hence, alternating currents are generated in the secondary windings and have a frequency dependent upon that of the mains. The intensity of these secondary currents is variable however, being dependent principally upon the varying distance from the core to the revolving poles. Thus the intensity of the secondary currents generated in each winding 18, 19, 20 constantly undergoes slow variations, dependent upon the speed of the motor 6 and having the general form of sine waves.

The operator by controlling the speed of the motor 6 by means of the rheostat 8, can thus at will regulate the frequency of the slow sine waves here contemplated.

The circuit through the motor circuit may be traced as follows: wire 3, wire 5, motor 6, wire 7, rheostat 8, wire 9 to wire 4, thence to source of supply and back to wire 3.

The primary circuit is as follows: wire 3, wire 38, rheostat 37, wire 36, primary winding 16, wire 45, resistance 44, wire 43, wire 66, contact arm 54, contact screw 59, wire 62, wire 4 to source of supply, thence back to wire 3. This circuit energizes the primary winding 17 with the cycle frequency of the alternating current employed for the purpose.

The circuit through the magnet is as follows: wire 3, wire 39, winding 40 of magnet 41, wire 42, wires 66, 67, contact arm 54, contact screw 59, wire 62, wire 4 to source of supply, thence back to wire 3.

The wire 63, condenser 64 and resistance 65 are bridged across the contact between the arm 54 and the screw 59, and thus serve to prevent undue sparking as between these two members whenever the circuit is broken.

The operation of my device is as follows:

The parts being assembled and arranged as shown in the drawing and as above described, and the wires 3 and 4 being energized by alternating currents, the motor 6 is thrown into action and the various movable parts perform the motions above described with reference to them.

The electrodes 30, 31, 32 are now applied to some part of the anatomy of the patient, and the multiphase faradic currents are thus distributed as above pointed out.

I do not limit myself to the precise mechanism shown, as variations may be made therein without departing from the spirit of my invention.

I claim:

1. The combination of a multiphase rotary transformer for producing faradic currents, connections for energizing said transformer by means of primary currents, and an interrupter controlled by said primary currents and synchronously driven thereby for interrupting said primary currents.

2. The combination of a rotary transformer provided with a plurality of secondary windings for producing multiphase faradic currents and further provided with a primary winding, means for supplying currents to said primary winding in order to energize said transformer, and an interrupter for breaking the circuit through said primary winding, said interrupter being synchronously driven relatively to said alternating currents.

3. In a device of the character described, the combination of a transformer provided with a primary winding whereby it is energized, and further provided with a plurality of secondary windings to be energized inductively by aid of said primary winding, a rotor provided with poles for shifting the magnetic field from said primary winding to each secondary winding in succession, so as to induce currents in said secondary windings, a plurality of separate electrodes, and separate conductors connecting said electrodes with said secondary windings, in order to distribute said induced currents as multiphase faradic currents.

4. In a device of the character described, the combination of a multiphase transformer for producing multiphase secondary currents, said transformer being provided with a primary winding, and a synchronous interrupter in circuit with said primary winding for the purpose of breaking the primary circuit.

5. The combination of a rotary transformer provided with a single primary and with a plurality of secondaries in order to produce multiphase currents, a plurality of separate electrodes communicating with said secondaries in order to distribute said multiphase currents as faradic currents through different portions of a living organism, connections for subjecting said primary to the action of alternating currents, and an interrupter synchronized with said alternating currents and in circuit with said primary winding for breaking the primary circuit during each cycle of said alternating current.

6. In a device of the character described, the combination of a primary, connections for subjecting the same to alternating currents, a secondary, a rotor disposed adjacent said primary and magnetically energized thereby, said rotor having a pole which is revoluble relatively to said secondary in order to induce therein secondary currents in form analogous to sine waves, and electrodes connected with said secondary in order to utilize as faradic currents said currents induced therein.

7. In a device of the character described, the combination of a primary, connections for subjecting said primary to the action of alternating currents, an interrupter connected with said primary for the purpose of periodically interrupting the circuit therethrough, a secondary, a rotor energized by said primary and provided with a pole revoluble relatively to said secondary in order to induce therein successive currents in groups analogous to sine waves, means controllable at the will of the operator for varying the speed of said rotor in order to vary the group frequency of said last mentioned currents, and electrodes connected with said secondaries for utilizing as faradic currents the currents induced within said secondaries.

8. In a device of the character described, the combination of a primary, means for subjecting said primary to the action of pulsating currents, a secondary, a rotor energized by said primary and provided with a pole revoluble relatively to said secondary, mechanism for turning said rotor at a frequency slow as compared with the frequency of said pulsating currents in order to induce within said secondary a succession of currents in groups analogous to sine waves, and electrodes connected with said secondary in order to utilize as faradic currents the currents induced therein.

9. In a device of the character described, the combination of a primary, means for subjecting said primary to the action of pulsating currents, a secondary, a rotor energized by said primary and provided with a pole revoluble relatively to said secondary, mechanism for turning said rotor at a speed frequency slow as compared with the frequency of said pulsating currents in order to induce within said secondary a succession of currents, in groups analogous to sine waves, means controllable at the will of the operator for adjusting within reasonable limits the speed of said rotor, and electrodes connected to said secondary in order to utilize as faradic currents the currents induced therein.

10. In a device of the character described, the combination of a primary, means for subjecting said primary to the action of pulsating currents, a plurality of stationary secondaries, a rotor disposed adjacent said primary and energized thereby, said rotor being provided with plates revoluble relatively to said secondaries, mechanism for turning said rotor in order to bring said poles into and out of proximity to each of said secondaries in succession, thus inducing currents in said secondaries, electrodes connected with said secondary in order to utilize as faradic currents the currents induced therein, and means controllable at the will of the operator for varying the speed of said rotor.

REINHOLD H. WAPPLER.